United States Patent [19]

Gerber

[11] 4,178,010
[45] Dec. 11, 1979

[54] IMPLEMENT HITCH ASSEMBLY

[76] Inventor: Jerome J. Gerber, Murdock, Kans. 67111

[21] Appl. No.: 924,243

[22] Filed: Jul. 13, 1978

[51] Int. Cl.² ............................................. B60D 1/00
[52] U.S. Cl. .................................... 280/412; 172/311
[58] Field of Search .......... 280/411 R, 411 C, 411 A, 280/412, 413; 172/310, 311, 313, 314, 282; 56/2, 6

[56] References Cited

U.S. PATENT DOCUMENTS

| 2,971,774 | 2/1961 | Bartel | 280/412 |
| 3,008,732 | 11/1961 | Raney | 280/412 |
| 3,112,124 | 11/1963 | Bartel | 280/412 |
| 3,292,948 | 12/1966 | McMasters et al. | 280/412 |
| 3,516,500 | 6/1970 | Butler | 172/282 |
| 3,738,682 | 6/1973 | Ritter | 280/412 |
| 4,002,334 | 1/1977 | Wilbeck | 280/412 |

FOREIGN PATENT DOCUMENTS 402339 10/1973 U.S.S.R. ............................... 280/411 C

*Primary Examiner*—John A. Pekar
*Attorney, Agent, or Firm*—John H. Widdowson

[57] ABSTRACT

An implement hitch assembly pivotally attached to the rear of a self-propelled pulling vehicle. The hitch assembly tows a front agricultural implement and a rear agricultural implement in a tandem position when traveling on a roadway. By releasing a front latch and at the same time releasing a cable that holds a rear wheel, the forward movement of the implements towed behind the pulling vehicle allows the rear wheel to fall back and moves the rear implement in a side-by-side position with the front implement when the implements are to be used in the field. When the implements are in a side-by-side position, the rear implement may be moved back to a tandem position with the front implement by releasing a rear latch.

9 Claims, 8 Drawing Figures

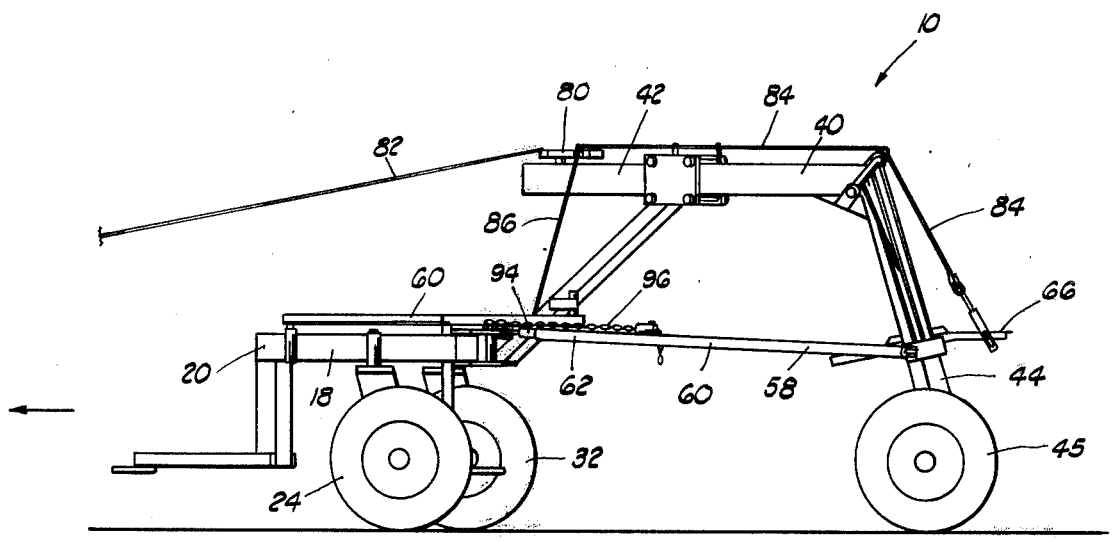
FIG. 5
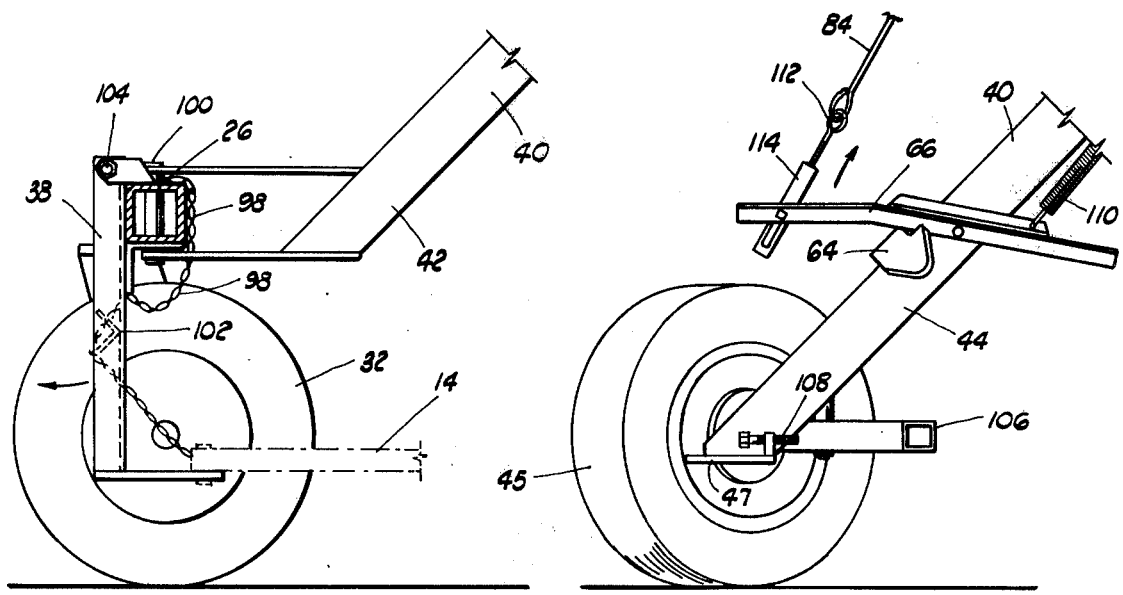
FIG. 6
FIG. 7

IMPLEMENT HITCH ASSEMBLY

BACKGROUND OF THE INVENTION

This invention relates generally to an implement hitch and more particularly, but not by way of limitation, to an implement hitch assembly used for towing a front agricultural implement and a rear agricultural implement such as grain drills or the like.

Hetetofore, there have been various types of mechanically operated implement hitches or implement draw bars such as the draw bar disclosed in U.S. Pat. No. 2,971,744 to Bartel and U.S. Pat. No. 3,292,948 to McMasters et al. Also, a hitch assembly is disclosed in U.S. Pat. No 3,008,732 to Raney and U.S. Pat. No. 3,516,500 to Butler. While these hitches and draw bars operate mechanically for pulling implements therebehind, their structure is distinctly different from the subject invention and they do not offer the advantages as described herein.

In U.S. Pat. No. 3,112,124 to Bartel and U.S. Pat. No. 3,738,682 to Ritter, two popular types of implement draw bars and hitches are disclosed for pulling grain drills, plows or the like. This equipment is hydraulically operated and again does not provide the structural advantages of the subject invention.

SUMMARY OF THE INVENTION

The subject implement hitch assembly is a heavy duty two implement hitch which is mechanically operated, thereby eliminating the need of using hydraulic controls for moving the implement from a tendem position to a side-by-side position or the need of getting off the tractor to pull pins, move bars around, etc.

Through the use of simple, mechanical linkage operated by a pull rope from the seat of the pulling vehicle, the rear implement can be moved into a position behind the front implement for traveling down the roadway with the overall width being no greater than the width of the individual implements. By again pulling the rope, a latch is released and the rear wheel is allowed to lag backward, and the forward travel of the implements moves the rear implement into a side-by-side position so that the implements may be used in the field.

The structural design of the implement hitch assembly provides for allowing the pulling vehicle to make both tight right and left turns when turning the equipment in the field.

The hitch is further designed so that the front implement is pulled by a chain mounted at each end, and a center hitch that is made to pull forward on short turns, taking pressure off the implements that were not designed to be locked in tandem.

The implement hitch assembly for attaching to the rear of a self-propelled vehicle and towing a front implement and a rear implement includes a hitch bar having one end pivotally attached to the pulling vehicle. The other end of the hitch bar is mounted on a hitch wheel. A draw bar which is laterally disposed to the direction of the travel is pivotally attached to one end of the hitch bar with the other end mounted on a draw bar wheel. The front implement is pivotally attached to a swinging hitch attached to the draw bar. A side bar is pivotally attached to the draw bar and includes one end mounted on a side bar wheel. The rear implement is pivotally attached to the end of the side bar. A pivot arm is pivotally attached to the side bar and the hitch bar. A first swing arm is pivotally attached to the side bar and a second swing arm. The second swing arm is pivotally attached to the hitch bar. A rear latch bracket is mounted on the end of the first swing arm and the second swing arm for releasably engaging a rear latch which is pivotally attached to the end of the side bar. When the rear latch is released from the rear latch bracket, the rear wheel is moved to a parallel position with the side bar and the rear implement moves from a side-by-side position to a tandem position with the front implement.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 5 is a side view of the assembly.

FIG. 6 is a side sectional view taken along lines 6—6 shown in FIG. 3.

FIG. 7 is a side sectional view of the assembly taken along line 7—7 shown in FIG. 3.

DETAILED DESCRIPTION OF THE DRAWINGS

Figure 1:
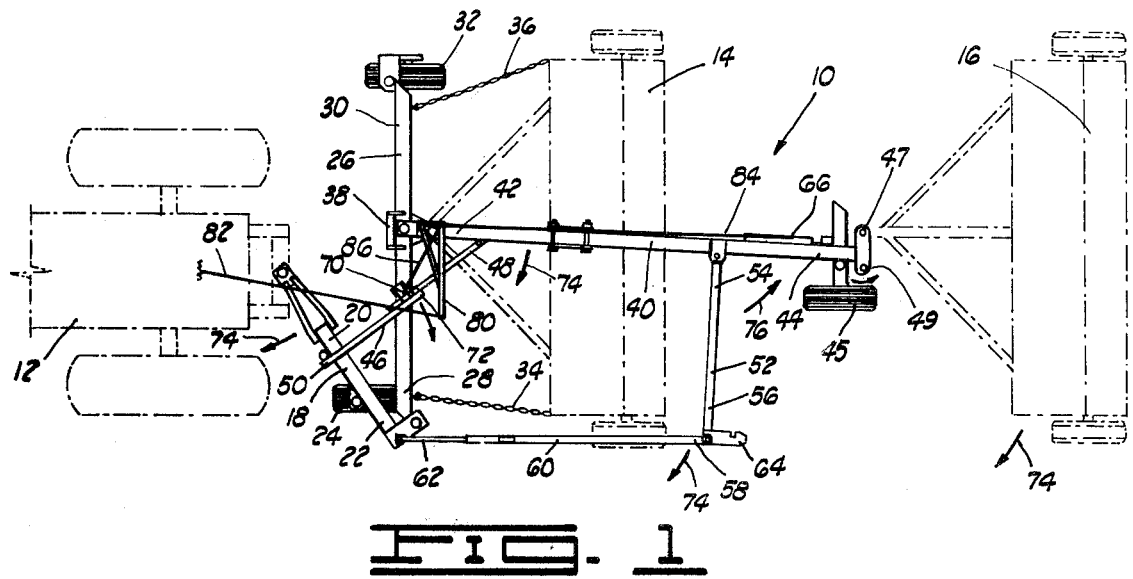
FIG. 1 is a top view of the implement hitch assembly pivotally attached to a front implement and a rear implement in a tandem position.

In FIG. 1, the implement hitch assembly is designated by general reference numeral 10. The assembly 10 is pivotally attached to the rear of a self-propelled pulling vehicle 12, shown in dotted lines. The assembly 10 tows a front agricultural implement 14 and a rear agricultural implement 16. The implements 14 and 16 are shown in dotted lines and in a tandem position in FIG. 1.

The assembly 10 includes a hitch bar 18 having a first end portion 20 adapted for pivot attachment to the rear of the pulling vehicle 12. A second end portion 22 of the hitch bar 18 is mounted on a hitch wheel 24.

A draw bar 26, which is laterally disposed to the direction of travel, includes a first end portion 28 pivotally attached to the second end portion 22 of the hitch bar 18. A second end portion 30 of the draw bar 26 is mounted on a draw bar wheel 32. A pair of front implement chains 34 and 36 are attached to the first end portion 28 and second end portion 30 of the draw bar 26. The other ends of the chains 34 and 36 are attached to the ends of the front implement 14 to aid in the turning of the front implement 14 and relieving excessive pressure being placed on the front implement 14, particularly during a right hand turn.

A front implement hitch 38 is attached to the center of the draw bar 26 and adapted for pivot attachment to the front implement 14. The hitch 38 allows the front implement to move fore and aft on the draw bar 26 when the implements 14 and 16 are pulled and turned by the vehicle 12.

Figure 2:
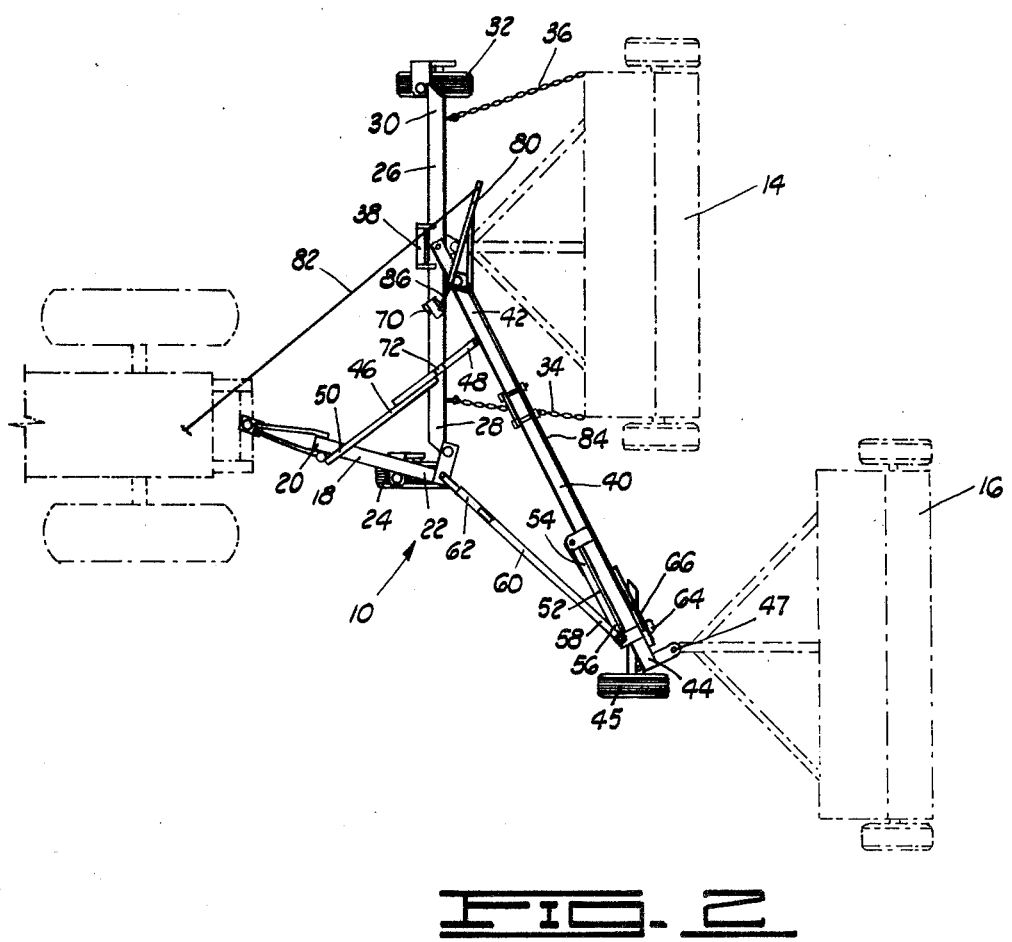
FIG. 2 is a top view of the implement hitch assembly with the front implement and the rear implement in a side-by-side position.

A side bar 40 includes a first end portion 42 which is pivotally attached to the center of the draw bar 26. The side bar 40 extends rearwardly and upwardly over the front implement 14 and includes a second end portion 44 mounted on a side bar wheel 45. The second end portion 44 of the side bar 40 is attached to a rear implement hitch 47 for pivot attachment to the rear implement 16. The hitch 47 includes a cam plate 49 mounted at one end for holding the wheel 45 in position when the rear implement 16 is moved into a side by side position as shown in FIG. 2.

A pivot arm 46 includes a first end portion 48 which is pivotally attached to the side bar 40 and intermediate the first end portion 42 and second end portion 44 of the side bar 40. A second end portion 50 of the pivot arm 46 is pivotally attached to the first end portion 20 of the hitch bar 18.

A first swing arm 52 includes a first end portion 54 which is pivotally attached to the side bar 40 and intermediate the first end portion 42 and second end portion 44. A second end portion 56 of the first swing arm 52 is pivotally attached to a first end portion 58 of a second swing arm 60. A second end portion 62 of the second swing arm 60 is pivotally attached to the second end portion 62 of the hitch arm 18.

A rear latch bracket 64 is attached to the second end portion 56 of the first swing arm 52 and the first end portion 58 of the second swing arm 60 and releasably engages a rear latch 66 attached to the second end portion 44 of the side arm 40.

The assembly 10 further includes a front latch 70 pivotally mounted on top of the draw bar 26 and used for releasably engaging a front latch bracket 72 mounted on the pivot arm 46.

In FIG. 2, the assembly 10 is shown with the rear implement 16 moved laterally to the left and now in a side-by-side position which is the normal field position, allowing the operator of the pulling vehicle 12 to plant with two grain drills at the same time, should the front implement 14 and rear implement 16 be grain drills, or similarly, if the front implement 14 and rear implement 16 are cultivators, then two cultivator widths could be plowed at the same time in the field. While the mechanical mechanism for moving the rear implement 16 into a side-by-side position with the front implement 14 is shown more clearly in FIGS. 3, 4 and 5, generally this is accomplished by releasing the front latch 70 by pulling a rope which in turn releases the pivot arm 46 from the draw bar 26 and at the same time releases the cable holding the side bar wheel 45. As the pulling vehicle 12 continues forward, the pivot arm 46 moves the side bar 40 to the left, wheel 45 falls back against a cam stop 49, and the wheel 45 moves to the left. At this point, the rear implement 16 begins to move laterally and to the left, as indicated by the arrows 74. As the rear implement 16 begins to move laterally and to the left, the first swing arm 52 pivots on the side bar 40 inwardly toward the second end portion 44 of the side bar 40. This movement is indicated by arrow 76. The first swing arm 52 folds against the side of side bar 40 and the rear latch bracket 64 is engaged by the rear latch 66 which holds the rear implement 16 in a side-by-side position with the front implement 14.

Figure 2A:
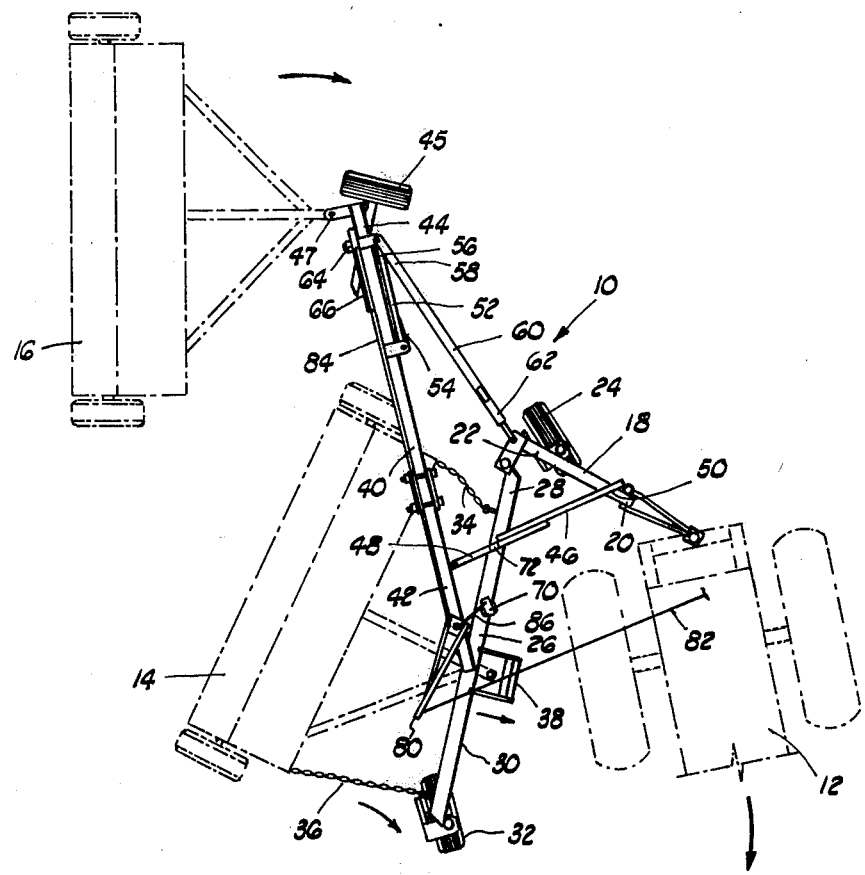
FIG. 2A is a top view of the implement hitch assembly with the pulling vehicle making a right turn.

In FIG. 2A, a top view of the assembly 10 is illustrated with the pulling vehicle 12 making a tight right turn which heretofore has been difficult, if not impossible, to make with prior art implement hitch assemblies similar to the subject invention. The tight right hand turn is accomplished by the ability of the front implement 14 to move forward on the draw bar 26 because of the hitch 38 which allows fore and aft movement on the draw bar 26 by the implement 14. Also, the use of the front implement chains 34 and 36 relieves the normal stress placed on the implement 14 during a turn of this type and allows the ends of the implement 14, in this case, to make a tight right turn. It should be noted that during a right turn of this type, the implement chain 34 goes into a slack position while the second implement chain 36 is under tension. Again, these chains 34 and 36 aid the assembly 10 in quickly turning the rear implement 16 and front implement 14. A left hand turn is accomplished in substantially the same manner, but with less difficulty since the rear implement 16 is in a left hand trailing position in relation to the front implement 14.

Figure 3:
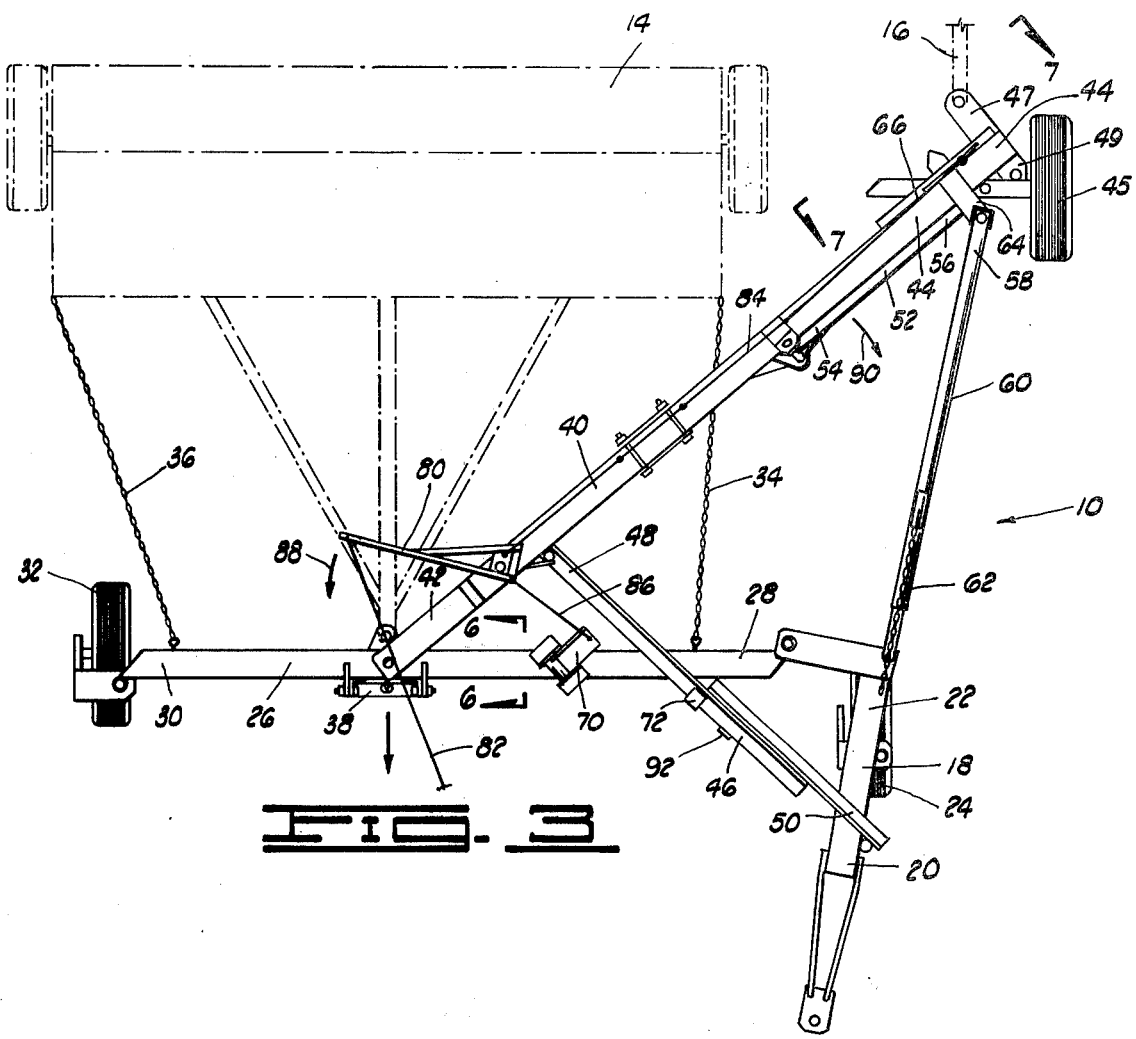
FIG. 3 is an enlarged top view of the assembly similar to the view in FIG. 2.

In FIG. 3, an enlarged top view of the assembly 10 is shown in greater detail. In this view, the front implement 14 is shown with only a portion of the rear implement 16. The assembly 10 is illustrated with the front implement 14 and rear implement 16 in a side-by-side position similar to FIG. 2.

A cable handle 80 is pivotally attached to the top of the side bar 40. One end of the handle 80 is attached to a rope 82 which is controlled by the operator driving the pulling vehicle 12. The other end of the handle 80 is attached to a first cable 84 which is mounted on the side bar 40 and attached to the rear latch 66 for engaging and disengaging the rear latch 66 from the rear latch bracket 64. A second cable 86 is attached to the handle 80 and the front latch 70. In the side-by-side position of front implement 14 and rear implement 16, the second cable 86 attached to the handle 80 holds the front latch 70 in a raised position, which can be seen more clearly in FIG. 4.

In operation, when it is desired to move the rear implement 16 into a tandem position with the front implement 14, the rope 82 is pulled by the operator, moving the handle 80 into a position similar to that shown in FIG. 1. As the handle 80 is rotated in a counterclockwise direction, shown by arrow 88, the first cable 84 urges the rear latch 66 upwardly, disengaging it from the rear latch bracket 64. At this time, the side bar wheel 45 is pulled in a parallel position with side bar 40, allowing the rear implement 16 to begin to move to the right and to the rear of the front implement 14. At the same time, the first swing arm 52, as indicated by arrow 90, moves outwardly and to the left from its folded position against the side bar 40. As the rear implement 16 continues to move to the rear and into a tandem position with the front implement 14, the side bar 40 in turn moves to the right and over the top of the front implement 14 and into a position as shown in FIG. 1. As the side bar 40 moves to the right, the pivot arm 46 also swings to the rear until a stop 92 attached to the pivot arm 46 comes into engagement against the front of the draw bar 26. At the same time, the front latch 70 drops downwardly behind the front latch bracket 72 on the pivot arm 46, thereby holding the assembly 10 in place with the rear implement 16 in a fixed tandem position behind the front implement 14.

Figure 4:
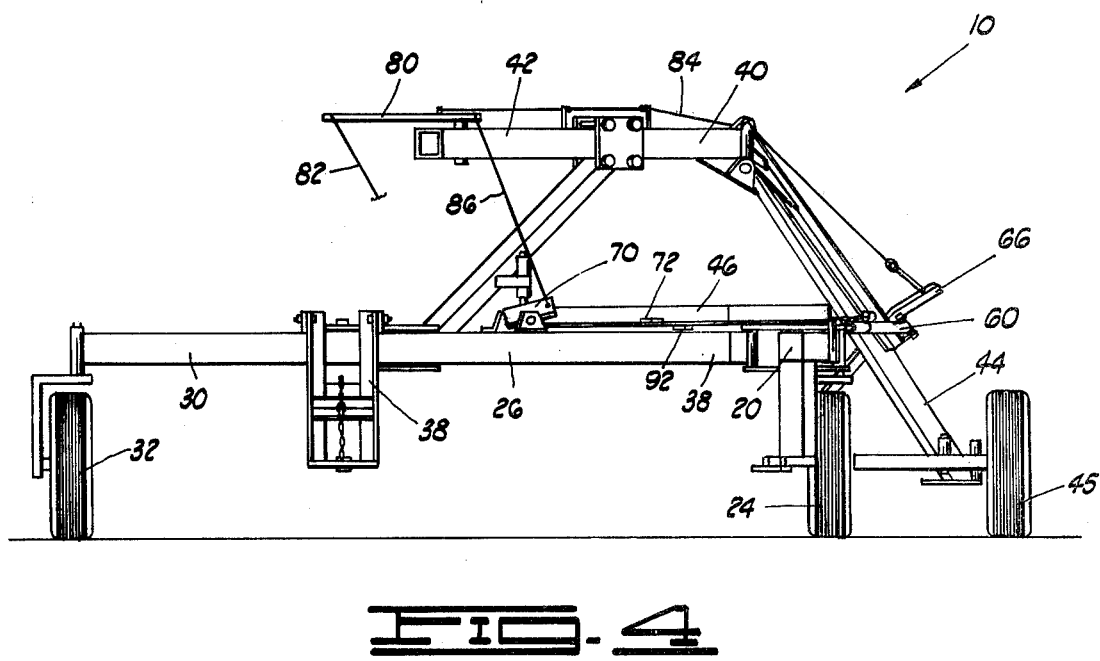
FIG. 4 is a front view of the assembly.

In FIG. 4, a front view of the assembly 10 is shown. In this view, the structure of the side bar 40 with the first end portion 42 and second end portion 44 can be seen more clearly. The structure of the side bar 40 is fabricated so that it moves back and forth from a tandem position to a side-by-side position and clears the structure of the front implement 14.

Also seen in this figure is the handle 80 with the first cable 84 extending rearwardly and attached to the rear latch 66. The second cable 86 is shown attached to the handle 80 and holding the front latch 70 in a raised position. It should be noted that when the cable handle 80 is rotated in a counterclockwise direction, as discussed under FIG. 3, sufficient slack in the second cable 86 is provided so that as the pivot arm 46 moves rearwardly, the front latch 70 drops behind the front latch bracket 72 for holding the rear implement 16 in place. Also shown in this figure is the stop 92 which prevents the pivot arm 46 from continuing to move rearwardly as the rear implement 16 moves into a tandem position behind the front implement 14.

In FIG. 5, a side view of the assembly 10 is shown. In this view the second swing arm 60 is shown having an extension rod 94 which is slidably received in the second end portion 62 of the second swing arm 60. The extension rod 94 is held in place by an extension chain 96 which is attached at one end to the hitch bar 18 and the other end attached to the second swing arm 60. By releasing the chain 96 and adjusting the extension rod 94 inside the second swing arm 60 and then holding the extension rod 94 in place by securing the chain 96, the overall length of the second swing arm 60 is adjusted so that the lateral movement of the rear implement 16 may be adjusted in relation to the front implement 14, as shown in FIGS. 2 and 3. This adjustment is important so that when there is planting or cultivating of rows in the field, there is no overlapping of planting and cultivating and gaps are prevented between the two implements.

In FIG. 6, a cutaway section of the assembly 10 is shown taken along line 6—6 shown in FIG. 3. In this view, a swing adjustment chain 98 can be seen attached to a pivot pin 100 which is used for securing the side bar 40 to the draw bar 26. The chain 98 is looped around a v-shaped support bar 102 which is part of the hitch 38. The other end of the chain 98 is secured to the front of the front implement 14. It should be noted that the hitch 38 is pivotally attached to the top of the draw bar 26 by a pivot pin 104. In this view, the chain 98 is shown having sufficient slack so that the front implement 14 can swing forward on the hitch 38. By adjusting the length of the chain 98 on the draw bar 26 and the front implement 14, the amount of fore and aft swing of the hitch 38 on the draw bar 26 is controlled.

In FIG. 7, a portion of the assembly 10 is shown taken along line 7—7 shown in FIG. 3. In this view the side bar wheel 45 can be seen mounted on an axle 106 which is pivotally attached to the second end portion 44 of the side bar 42. The rear implement hitch 47 includes a stop 108 for holding the axle 106 and the side bar wheel 45 in its proper position for moving the implement in a forward direction. By adjusting the length of the stop 108, the alignment of the wheel 45 is adjusted.

Also shown in this figure is the rear latch 66 held in an engaged position with the rear latch bracket 64 by a coil spring 110 mounted on one end of the rear latch 66. The coil spring 110 is attached to a portion of the side bar 40. To disengage the rear latch 66 from the rear latch bracket 64, the first cable 84 is urged upwardly by the handle 80. The length of the first cable 84 is adjustable by the use of a threaded bolt 112 attached to a threaded keeper 114 mounted on the other end of the rear latch 66.

Changes may be made in the construction and arrangement of the parts or elements of the embodiments as described herein without departing from the spirit or scope of the invention defined in the following claims.

What is claimed is:

1. An implement hitch assembly attached to the rear of a self-propelled pulling vehicle, the assembly towing a front implement and a rear implement in a tandem position when traveling on a roadway, the assembly towing the front implement in a side-by-side position with the rear implement when in the field, the assembly comprising:
   a hitch bar having a first end portion adapted for pivot attachment to the pulling vehicle and a second end portion mounted on a hitch wheel;
   a draw bar laterally disposed to the direction of travel, said draw bar having a first end portion pivotally attached to the second end portion of said hitch bar and a second end portion mounted on a draw bar wheel, the front implement pivotally attached to said draw bar;
   a side bar having a first end portion pivotally attached to said draw bar and a second end portion mounted on a side bar wheel, the rear implement pivotally attached to said side bar;
   a pivot arm having a first end portion pivotally attached to said side bar and a second end portion pivotally attached to the first end portion of said hitch bar;
   a first swing arm having a first end portion pivotally attached to said side bar and a second end portion;
   a second swing arm having a first end portion pivotally attached to the second end portion of said first swing arm and a second end portion attached to the second end portion of said hitch bar;
   a rear latch bracket mounted on the second end portion of said first swing arm and the first end portion of said second swing arm and releasably engaging a rear latch pivotally attached to the second end portion of said side bar; and
   a front latch bracket mounted on said pivot arm and releasably engaging a front latch pivotally attached to said draw bar.

2. The assembly as described in claim 1 further including a front implement hitch attached to said draw bar and adapted for pivot attachment to the front implement.

3. The assembly as described in claim 2 wherein said front implement hitch is pivotally attached to said draw bar thereby allowing the front implement to swing fore and aft on said draw bar.

4. The assembly as described in claim 3 further including a swing adjustment chain attached to one end to said draw bar and wrapped around said first implement hitch with the other end of said chain attached to the front implement, by adjusting the length of chain the amount of swing of said first implement hitch is controlled.

5. The assembly as described in claim 1 further including a rear implement hitch mounted on the end of said second end portion of said side bar and adapted for pivot attachment to the rear implement.

6. The assembly as described in claim 1 further including a cable handle pivotally attached to said side bar, a first cable attached at one end to said handle with the other end attached to said front latch, a second cable attached at one end to said handle with the other end attached to said rear latch, by pivoting said handle on said side bar, said first cable and said second cable engage and disengage said front latch and said rear latch.

7. The assembly as described in claim 1 further including a pair of front implement chains attached at one end to the ends of the front implement and the other ends of the said chains attached to the first and second end portion of said draw bar, said chains aiding the assembly in aligning the front implement behind said draw bar and reducing strain on the front implement when the implements are turned by the pulling vehicle.

8. The assembly as described in claim 1 wherein said second swing arm is adjustable in length so that the lateral movement of the rear implement may be controlled when the implements are moved into a side-by-side position in the field.

9. An implement hitch assembly attached to the rear of a self-propelled pulling vehicle, the assembly towing a front implement and a rear implement in a tandem position when traveling on a roadway, the assembly towing the front implement in a side-by-side position with the rear implement when in the field, the assembly comprising:

a hitch bar having a first end portion adapted for pivot attachment to the pulling vehicle and a second end portion mounted on a hitch wheel;

a draw bar laterally disposed to the direction of travel, said draw bar having a first end portion pivotally attached to the second end portion of said hitch bar and a second end portion mounted on a draw bar wheel;

a front implement hitch attached to said draw bar and adapted for pivot attachment to the front implement;

a side bar having a first end portion pivotally attached to said draw bar intermediate the first end portion and the second end portion of said draw bar and a second end portion mounted on a side bar wheel;

a rear implement hitch mounted on the end of said second end portion of said side bar, said rear implement hitch adapted for pivot attachment to the rear implement;

a pivot arm having a first end portion pivotally attached to said side bar intermediate the first end portion and the second end portion of said side bar and a second end portion pivotally attached to the first end portion of said hitch bar;

a first swing arm having a first end portion pivotally attached to said side bar intermediate the first end portion and the second end portion of said side bar and a second end portion;

a second swing arm having a first end portion pivotally attached to the second end portion of said first swing arm and a second end portion attached to the second end portion of said hitch bar;

a rear latch bracket mounted on the second end portion of said first swing arm and the first end portion of said second swing arm and releasably engaging a rear latch pivotally attached to the second end portion of said side bar; and a front latch bracket mounted on said pivot arm and releasably engaging a front latch pivotally attached to said draw bar.

* * * * *